United States Patent
Mifuka

(10) Patent No.: US 9,862,823 B2
(45) Date of Patent: Jan. 9, 2018

(54) RESIN COMPOSITION FOR WET FRICTION MATERIAL, PHENOLIC RESIN FOR WET FRICTION MATERIAL AND WET FRICTION MATERIAL

(71) Applicant: SUMITOMO BAKELITE CO., LTD., Tokyo (JP)

(72) Inventor: Hajime Mifuka, Tokyo (JP)

(73) Assignee: SUMITOMO BAKELITE CO., LTD., Tokyo (JP)

(*) Notice: Subject to any disclaimer, the term of this patent is extended or adjusted under 35 U.S.C. 154(b) by 35 days.

(21) Appl. No.: 14/226,377

(22) Filed: Mar. 26, 2014

(65) Prior Publication Data

US 2014/0296374 A1 Oct. 2, 2014

(30) Foreign Application Priority Data

Mar. 27, 2013 (JP) .................. 2013-065672

(51) Int. Cl.
*C08L 71/08* (2006.01)
*C08L 61/12* (2006.01)
*C08L 61/06* (2006.01)

(52) U.S. Cl.
CPC .............. *C08L 71/08* (2013.01); *C08L 61/06* (2013.01); *C08L 61/12* (2013.01)

(58) Field of Classification Search
CPC .................. C08L 71/08; C08L 61/12
See application file for complete search history.

(56) References Cited

U.S. PATENT DOCUMENTS

| | | | |
|---|---|---|---|
| 4,076,873 A * | 2/1978 | Shea ................. | C03C 25/26 138/129 |
| 6,554,051 B1 * | 4/2003 | Werner ............... | B22C 1/2253 164/16 |
| 2003/0166825 A1 * | 9/2003 | Aiba .................. | C08G 8/10 528/129 |
| 2004/0006192 A1 * | 1/2004 | Aiba .................. | C08G 8/10 528/129 |
| 2006/0094853 A1 * | 5/2006 | Arbuckle ............. | C08G 8/04 528/128 |
| 2006/0223907 A1 * | 10/2006 | Mori et al. ........... | 523/149 |

FOREIGN PATENT DOCUMENTS

| | | |
|---|---|---|
| CN | 101613446 A | 12/2009 |
| CN | 102304210 A | 1/2012 |
| JP | 11-092623 A | 4/1999 |
| JP | 2002201245 A * | 7/2002 |
| JP | 2013142142 A * | 7/2013 |
| RU | 2175335 C2 * | 10/2001 |

OTHER PUBLICATIONS

Machine Translation of RU 2175335.*
Machine translation of JP 2013-142142 A, Dec. 2016.*
Office Action dated Mar. 2, 2017, issued in counterpart Chinese Patent Application No. 201410113673.8 (w/ English translation; 15 pages).
Office Action dated Oct. 23, 2017, issued in counterpart Chinese Patent Application No. 201410113673.8 (w/ English translation; 14 pages).

* cited by examiner

*Primary Examiner* — Nicole Buie-Hatcher

(74) *Attorney, Agent, or Firm* — Westerman, Hattori, Daniels & Adrian, LLP

(57) ABSTRACT

A phenolic resin for a wet friction material of the present invention is a phenolic resin used in a wet friction material and a bisphenol-modified phenolic resin modified with bisphenols. In addition, a wet friction material of the present invention is formed using the phenolic resin for a wet friction material.

5 Claims, No Drawings

RESIN COMPOSITION FOR WET FRICTION MATERIAL, PHENOLIC RESIN FOR WET FRICTION MATERIAL AND WET FRICTION MATERIAL

This application is based on Japanese patent application No. 2013-065672, the content of which is incorporated hereinto by reference.

BACKGROUND

Technical Field

The invention relates to a resin composition for a wet friction material, a phenolic resin for a wet friction material and a wet friction material.

Related Art

A phenolic resin as a thermosetting resin is widely used mainly as a binder for binding materials that become a substrate of a molded product and is used in various fields since the phenolic resin has excellent mechanical properties, electrical properties and adhesiveness. Particularly, in recent years, the usage of friction materials in which the phenolic resin is used as a binder has been increased in automobiles and railway vehicles.

Among the above, as a friction material which is referred to as a wet paper friction material and used in an automatic transmission of an automatic vehicle or the like, a liquid resol type phenolic resin is generally used. Improvement is increasingly required for the properties of the phenolic resin for a wet paper friction material year by year, and particularly, in order to cope with increase in a load on the wet friction material due to improvement in fuel consumption of a vehicle, improvement in engine output of a vehicle, increase in vehicle weight, and the like, particularly, improvement in adhesion with a substrate and improvement in strength have been increasingly required.

In the general phenolic resin, the molecular weight can be adjusted by mainly setting a reaction molar ratio (F/P) of phenols (P) and aldehydes (F) as materials. As the reaction molar ratio becomes higher, the molecular weight increases and mechanical properties such as strength or the like also increase. However, when the molecular weight is high, the impregnation properties of the substrate with the phenolic resin are deteriorated, and also, the resin becomes too hard and brittle. As a result, a sufficient adhesive force may not be obtained.

In addition, by modifying the phenolic resin using various modifiers, it is possible to impart various functions to the resin. Aralkyl-modified phenolic resins and alkylbenzene-modified phenolic resins having excellent heat resistance, elastomer-modified phenolic resins and oil-modified phenolic resins having excellent flexibility, and the like are examined and some of the resins are practically used. However, a modification method of improving the mechanical properties has not yet been found.

Here, as a method of satisfying the above requirement, it has been examined that a powdered inorganic material such as calcium carbonate, silica, alumina, or the like, which has excellent mechanical strength, is mixed into the phenolic resin. Particularly, a method in which a metal oxide is dispersed in the resin using the hydrolysis and polycondensation of metal alkoxide, which is referred to as sol-gel reaction, has been frequently examined (for example, refer to Japanese Unexamined Patent Publication No. H11-92623). However, the method is not yet practically used due to problems in production, cost and the like.

SUMMARY

The present invention is to provide a phenolic resin for a wet friction material that can be used to obtain a wet paper friction material which has an excellent balance between strength and adhesion between a substrate and a resin, a resin composition for a wet friction material, and a wet friction material.

In one embodiment of the present invention, there is provided a resin composition for a wet friction material including a bisphenol-modified phenolic resin modified with bisphenols, and an organic solvent.

In another embodiment of the present invention, there is provided a phenolic resin for a wet friction material which is used in a wet friction material and is a bisphenol-modified phenolic resin modified with bisphenols.

In still another embodiment of the present invention, there is provided a wet friction material which is formed using the above described resin composition for a wet fraction material.

When the phenolic resin of the present invention is used as a binder, it is possible to obtain a wet paper friction material which has an excellent balance between strength and adhesion between a substrate and the resin.

DETAILED DESCRIPTION

The invention will be now described herein with reference to illustrative embodiments. Those skilled in the art will recognize that many alternative embodiments can be accomplished using the teachings of the present invention and that the invention is not limited to the embodiments illustrated for explanatory purposes.

Hereinafter, a phenolic resin for a wet friction material, a resin composition for a wet friction material, and a wet friction material of the present invention will be described in detail.

The phenolic resin for a wet friction material of the present invention is a bisphenol-modified phenolic resin modified with bisphenols. Therefore, it is possible to realize a wet paper friction material which has excellent properties of a phenolic resin such as heat resistance and curability and has an excellent balance between strength and adhesion.

In the embodiment, for example, the phenolic resin for a wet friction material is liquid at 25° C. Therefore, it is possible to efficiently improve impregnation properties of a fiber substrate with a resin composition for a wet friction material which is prepared using the phenolic resin for a wet friction material.

The bisphenol-modified phenolic resin used in the present invention is not particularly limited and examples thereof can be obtained by reacting phenols, aldehydes, and the bisphenols with each other.

The phenols used herein is not particularly limited and examples thereof include monovalent phenols such as phenol, substituted monovalent phenols such as cresols such as o-cresol, m-cresol, and p-cresol, xylenols such as 2,3-xylenol, 2,4-xylenol, 2,5-xylenol, 2,6-xylenol, 3,4-xylenol, and 3,5-xylenol, ethylphenols such as o-ethylphenol, m-ethylphenol, and p-ethylphenol, isopropylphenol, butylphenols such as butylphenol, and p-tert-butylphenol, alkylphenols such as p-tert-amylphenol, p-octylphenol, p-nonylphenol, and p-cumylphenol, halogenated phenols such as fluorophenol, chlorophenol, bromophenol, and iodophenol, p-phenylphenol, aminophenol, nitrophenol, dinitrophenol, and trinitrophenol, 1-naphthol, and 2-naphthol, and polyvalent phenols such as resorcin, alkylresorcins, pyrogallol, catechol, alkylcatechols, hydroquinone, alkylhydroquinones, and phloroglucine. These can be used alone, or two or more kinds thereof can be used as a mixture. Among these phenols, those selected from phenol, and cresols are preferable. Therefore, it is possible to improve the mechanical strength of the wet friction material obtained by using the phenolic resin for a wet friction material of the present invention.

In addition, the aldehydes is not particularly limited and examples thereof include formaldehyde, paraformaldehyde, trioxane, acetaldehyde, propionaldehyde, polyoxymethylene, chloral, hexamethylenetetramine, furfural, glyoxal, n-butyraldehyde, caproaldehyde, allylaldehyde, benzaldehyde, crotonaldehyde, acrolein, tetraoxymethylene, phenylacetaldehyde, o-tolualdehyde, and salicylaldehyde. These can be used alone or two or more kinds thereof can be used in combination. Among these aldehydes, one selected from formaldehyde and paraformaldehyde is preferable. Therefore, it is possible to improve reactivity when the bisphenol-modified phenolic resin is synthesized.

In addition, the bisphenols is not particularly limited and examples thereof include bisphenol S, bisphenol F, bisphenol A, bisphenol C, bisphenol Z, and bisphenol E. These can be used alone, or two or more kinds thereof can be used in combination. By using the bisphenols as a modifier, a rigid resin skeleton in which modification is suppressed can be formed. Accordingly, it is possible to a cured material having excellent strength and elasticity while curability and heat resistance are improved. Among these bisphenols, bisphenol S is particularly preferable from the viewpoint of improving durability, heat resistance, strength, and adhesion between the substrate and the resin.

Next, a method of synthesizing the phenolic resin for a wet friction material will be described. The method of synthesizing the phenolic resin for a wet friction material is not particularly limited and examples thereof include a method of obtaining a resol type bisphenol-modified phenolic resin by reacting the phenols, the aldehydes, and the bisphenols with each other in the presence of a basic catalyst, and a method of obtaining a novolac type bisphenol-modified phenolic resin by reacting the phenols, the aldehydes, and the bisphenols with each other in the presence of an acid catalyst.

The basic catalyst is not particularly limited and examples thereof include alkali metal hydroxides such as sodium hydroxide, lithium hydroxide, and potassium hydroxide, ammonia water, tertiary amines such as triethylamine, oxides and hydroxides of alkaline earth metals such as calcium, magnesium and barium, and other alkaline substances such as sodium carbonate and hexamethylenetetramine. These can be used alone, or two or more kinds thereof can be used in combination.

The acid catalyst is not particularly limited and examples thereof include organic acids such as acetic acid and oxalic acid, mineral acids such as hydrochloric acid, sulfuric acid, and phosphoric acid, diethyl sulfate, paratoluensulfonic acid, and paraphenolsulfonate. These can be used alone or two or more kinds thereof can be used in combination.

In the synthesis of the phenolic resin for a wet friction material, a ratio of a structure formed by the bisphenols is preferably equal to or more than 2% by mass and equal to or less than 70% by mass with respect to the total phenolic resin for a wet friction material. The ratio is more preferably equal to or more than 10% by mass and equal to or less than 50% by mass. Therefore, when the phenolic resin for a wet friction material of the present invention is applied to the production of the wet friction material, it is possible to improve the strength, durability, and adhesion between the substrate and the resin of the paper friction material while curability and heat resistance are improved. In addition, the ratio of the structure formed by the bisphenols can be obtained by a blending amount of the bisphenols with respect to a total amount of phenols, aldehydes, and bisphenols used in the synthesis of the phenolic resin for a wet friction material.

Next, the resin composition for a wet friction material of the present invention will be described.

The resin composition for a wet friction material includes the phenolic resin for a wet friction material which is a bisphenol-modified phenolic resin, and an organic solvent. The organic solvent to be used is not particularly limited and examples thereof include alcohol-based organic solvents such as methanol, ethanol, isopropanol, and butanol, ketone-based organic solvents such as acetone, methyl ethyl ketone, and methyl isobutyl ketone, aromatic hydrocarbon solvents such as toluene and ethylbenzene, and mixtures thereof. Among these, it is more preferable for the resin composition to include alcohol-based organic solvents from the viewpoints of realizing an efficient production process at a low cost and improving the impregnation properties of the substrate with the resin composition, and it is particularly preferable to include methanol.

Here, the resin composition for a wet friction material may include components other than the above-described components. The aforementioned other components are not particularly limited and examples thereof include phenolic resins other than bisphenol-modified phenolic resin, water, and curing agents such as hexamine.

The resin composition for a wet friction material of the present invention can be suitably used particularly for impregnation. The substrate to be impregnated is not particularly limited and a substrate obtained by using one or two or more kinds of fibers such as natural fiber, metal fiber, carbon fiber, and chemical fiber can be used. In this case, for example, it is possible to form a wet friction material by impregnating a substrate formed of a fiber material with the resin composition for a wet friction material, and baking and curing the substrate.

When the resin composition for a wet friction material of the present invention is used in the wet paper friction material, it is possible to obtain a wet friction material by impregnating a paper substrate filled with metal fiber, carbon fiber or chemical fiber, a friction modifier such as cashew dust, diatomaceous earth and the like with the resin composition for a wet friction material of the present invention, and baking and curing the substrate.

The obtained wet friction material has the excellent properties of a phenolic resin such as heat resistance and curability, and also has an excellent balance between strength and adhesion between the substrate and the resin.

EXAMPLES

Hereinafter, examples of the present invention will be described in detail and the present invention is not limited to the examples.

The term "part(s)" described herein refers to "part(s) by mass", and "%" refers to "% by mass".

Example 1

600 parts of bisphenol S, 600 parts of phenol, 1400 parts of a 37% aqueous formalin solution, and 100 parts of triethylamine were put in a reactor provided with a stirring device, a reflux condenser, and a thermometer. Then, the resulting mixture was heated to increase the temperature to 100° C. and stirred for 1 hour, followed by a reaction. Then, 140 parts of methanol was added and dissolved when the temperature in the system reaches 65° C. while the resultant was dehydrated under a reduced pressure of 91 kPa. After further reaction at 80° C. for 2 hours, 600 parts of methanol was added to obtain 3200 parts of a phenolic resin composition (a) having a nonvolatile content of 50%. In addition, some of the obtained phenolic resin composition (a) was subjected to a solvent removing process to remove methanol. Thus, it was confirmed that the obtained bisphenol-modified phenolic resin was liquid at 25° C.

Example 2

200 parts of bisphenol S, 1000 parts of phenol, 1400 parts of a 37% aqueous formalin solution, and 100 parts of triethylamine were put in a reactor provided with a stirring device, a reflux condenser, and a thermometer. Then, the resulting mixture was heated to increase the temperature to 100° C. and stirred for 1 hour, followed by reaction. Then, 140 parts of methanol was added and dissolved when the temperature in the system reaches 65° C. while the resultant was dehydrated under a reduced pressure of 91 kPa. After further reaction at 80° C. for 2 hours, 600 parts of methanol was added to obtain 3200 parts of a phenolic resin composition (b) having a nonvolatile content of 52%. In addition, some of the obtained phenolic resin composition (b) was subjected to a solvent removing process to remove methanol. Thus, it was confirmed that the obtained bisphenol-modified phenolic resin was liquid at 25° C.

Example 3

600 parts of bisphenol F, 600 parts of phenol, 1400 parts of a 37% aqueous formalin solution, and 100 parts of triethylamine were put in a reactor provided with a stirring device, a reflux condenser, and a thermometer. Then, the resulting mixture was heated to increase the temperature to 100° C. and stirred for 1 hour, followed by reaction. Then, 140 parts of methanol was added and dissolved when the temperature in the system reaches 65° C. while the resultant was dehydrated under a reduced pressure of 91 kPa. After further reaction at 80° C. for 2 hours, 600 parts of methanol was added to obtain 3150 parts of a phenolic resin composition (c) having a nonvolatile content of 51%. In addition, some of the obtained phenolic resin composition (c) was subjected to a solvent removing process to remove methanol. Thus, it was confirmed that the obtained bisphenol-modified phenolic resin was liquid at 25° C.

Comparative Example 1

1200 parts of phenol, 1400 parts of a 37% aqueous formalin solution, and 100 parts of triethylamine were put in a reactor provided with a stirring device, a reflux condenser, and a thermometer. Then, the resulting mixture was heated to increase the temperature to 100° C. and stirred for 1 hour, followed by reaction. Then, 140 parts of methanol was added and dissolved when the temperature in the system reaches 65° C. while the resultant was dehydrated under a reduced pressure of 91 kPa. After further reaction at 80° C. for 2 hours, 600 parts of methanol was added to obtain 3100 parts of a phenolic resin composition (d) having a nonvolatile content of 53%.

2. Evaluation of Phenolic Resin Compositions Gelation Time 1.5 ml of any of the phenolic resin compositions (a) to (d) obtained in Examples and Comparative Example was placed on a hot plate heated to 165° C. and stirred with a spatula by stirring two times for one second. Then, the time until the phenolic resin compositions a to d gelled was measured.

Tensile Strength and Tensile Elastic Modulus

By using any of the phenolic resin compositions (a) to (d) obtained in Examples and Comparative Example, impregnated paper was prepared. As a substrate, commercially available filter paper (120 mm×10 mm×thickness of 1 mm) was used. Any of phenolic resin compositions (a) to (d) obtained in Examples and Comparative Example was diluted with acetone to prepare a solution with a resin concentration of 30%, and the above filter paper was impregnated with the solution. Thereafter, the paper was dried and cured in an oven at 190° C. for 30 minutes, thereby obtaining a test piece. The tensile strength and tensile elastic modulus of the obtained test piece were measured according to JIS P 8113 "Paper and Board-Determination of Tensile Properties". In addition, the strength of the resin itself and the adhesion between the resin and the substrate can be evaluated by the tensile strength and tensile elastic modulus of the impregnated paper at the same time, and when either the strength of the resin itself or the adhesion between the resin and the substrate is deteriorated, a high value cannot be obtained.

Tensile Strength After Heat Treatment

The tensile strength after heat treatment of each of the phenolic resin compositions obtained in Examples and Comparative Example was measured as follows. First, any of the obtained phenolic resin compositions (a) to (d) was diluted with acetone to prepare a solution with a resin concentration of 30%, and a substrate was impregnated with the solution. Thereafter, the paper was dried and cured in an oven at 190° C. for 30 minutes, thereby obtaining a test piece. As the substrate, commercially available filter paper (120 mm×10 mm×thickness of 1 mm) was used. Next, the obtained test piece was subjected to heat treatment under the conditions of 240° C. and 1 hour. Then, the tensile strength of the test piece which had been subjected to heat treatment was measured according to JIS P 8113 "Paper and Board-Determination of Tensile Properties". Here, the heat resistance can be evaluated to be more satisfactory as the tensile strength after the heat treatment at 240° C. increases.

Rockwell Hardness

The Rockwell hardness of each of the phenolic resin compositions obtained in Examples and Comparative Example was measured as follows. First, any of the obtained phenolic resin compositions (a) to (d) was diluted with acetone to prepare a solution with a resin concentration of 30%, and a substrate was impregnated with the solution. Thereafter, the paper was dried and cured in an oven at 190° C. for 30 minutes, thereby obtaining a test piece. As the substrate, commercially available filter paper (120 mm×10 mm×thickness of 1 mm) was used. Next, the Rockwell hardness of the obtained test piece was measured according to JIS K 7202 "Method of Rockwell Hardness Test for Plastics".

The measurement results are summarized in Table 1.

TABLE 1

| | Example 1 | Example 2 | Example 3 | Comparative Example 1 |
|---|---|---|---|---|
| Phenol resin | a | b | c | d |
| Bisphenols | Bisphenol S | Bisphenol S | Bisphenol F | No modification |
| Ratio of structure formed by bisphenols [% by mass] | 35 | 12 | 35 | 0 |
| Gelation time [second] | 46 | 45 | 38 | 47 |
| Tensile strength [MPa] | 15.1 | 13.5 | 13.2 | 11.9 |
| Tensile elastic modulus [GPa] | 1.9 | 1.7 | 1.6 | 1.3 |
| Tensile strength after treatment at 240° C. for 1 hour [MPa] | 10.2 | 9.1 | 8.7 | 6.2 |
| Rockwell hardness | 80 | 77 | 75 | 72 |

The phenolic resin compositions (a), (b), and (c) obtained in Examples 1, 2, and 3 include the phenolic resin for a wet friction material of the present invention. The phenolic resin composition (d) obtained in Comparative Example 1 includes a phenolic resin without modification obtained from phenol, and formaldehyde. It is found that both the tensile strength and tensile elastic modulus of the phenolic resin compositions (a), (b), and (c) obtained in Examples 1, 2, and 3 are improved compared to the phenolic resin composition (d) obtained in Comparative Example 1, and the impregnated paper which has high strength and excellent adhesion with the substrate is produced.

Since the phenolic resin for a wet friction material of the present invention has excellent properties of a phenol resin such as heat resistance and curability and can be used to obtain a cured material having excellent strength and adhesion with the substrate, the phenolic resin for a wet friction material can be suitably used in the wet friction material and the like.

It is apparent that the present invention is not limited to the above embodiment, and may be modified and changed without departing from the scope and spirit of the invention.

What is claimed is:

1. A resin composition for a wet friction material comprising:
    a phenolic resin modified with bisphenols, which includes a structure formed by phenols and a structure formed by the bisphenols; and
    an alcohol-based organic solvent,
    wherein the phenolic resin is obtained by reacting phenols, which are different from bisphenols, aldehydes, and the bisphenols with each other, wherein the phenolic resin is liquid at 25° C.,
    wherein a ratio of the structure formed by the bisphenols is equal to or more than 10% by mass and equal to or less than 50% by mass with respect to the total phenolic resin,
    wherein the bisphenols contain one or more kinds selected from the group consisting of bisphenol S, bisphenol F, bisphenol A, bisphenol C, bisphenol Z, and bisphenol E,
    wherein the phenols contain one or more kinds selected from the group consisting of monovalent phenols, resorcin, alkylresorcins, pyrogallol, catechol, alkylcatechols, hydroquinone, alkylhydroquinones, and phloroglucine, and
    wherein the resin composition does not include a silane coupling agent.

2. The resin composition for a wet friction material according to claim 1,
    wherein the bisphenols are bisphenol S.

3. The resin composition for a wet friction material according to claim 1,
    wherein the phenolic resin is a resol type phenolic resin.

4. The wet friction material which is formed by impregnating a substrate formed of a fiber material with the resin composition for a wet friction material according to claim 1.

5. A resin composition for a wet friction material comprising:
    a phenolic resin modified with bisphenols, which includes a structure formed by phenols and a structure formed by the bisphenols; and
    an organic solvent,
    wherein the phenolic resin is obtained by reacting phenols, which are different from bisphenols, aldehydes, and the bisphenols with each other, wherein the phenolic resin is liquid at 25° C.,
    wherein a ratio of the structure formed by the bisphenols is equal to or more than 10% by mass and equal to or less than 50% by mass with respect to the total phenolic resin, and
    wherein the resin composition does not include a silane coupling agent.

* * * * *